(12) United States Patent
Krüger et al.

(10) Patent No.: US 11,449,341 B2
(45) Date of Patent: Sep. 20, 2022

(54) ELECTRONIC DEVICE AND METHOD FOR DATA PROCESSING USING VIRTUAL REGISTER MODE

(71) Applicant: TEXAS INSTRUMENTS INCORPORATED, Dallas, TX (US)

(72) Inventors: Marko Krüger, Freising (DE); Steven Bartling, Plano, TX (US); Markus Kösler, Landshut (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/564,652

(22) Filed: Sep. 9, 2019

(65) Prior Publication Data
US 2020/0073667 A1    Mar. 5, 2020

Related U.S. Application Data

(60) Continuation of application No. 14/739,236, filed on Jun. 15, 2015, now Pat. No. 10,409,607, which is a
(Continued)

(30) Foreign Application Priority Data

Sep. 20, 2010    (DE) ..................... 10 2010 045 800.7

(51) Int. Cl.
*G06F 9/30* (2018.01)
*G06F 9/38* (2018.01)
*G06F 1/3237* (2019.01)

(52) U.S. Cl.
CPC .......... *G06F 9/3826* (2013.01); *G06F 1/3237* (2013.01); *G06F 9/3016* (2013.01);
(Continued)

(58) Field of Classification Search
CPC .. G06F 9/3826; G06F 1/3237; G06F 9/30101; G06F 9/3016; G06F 9/30189; G06F 9/3861
See application file for complete search history.

(56) References Cited

U.S. PATENT DOCUMENTS

| 6,240,507 | B1 * | 5/2001 | Derrick | G06F 9/3013 712/217 |
| 6,564,331 | B1 * | 5/2003 | Joshi | G06F 1/3228 365/230.01 |
| 2006/0168463 | A1 * | 7/2006 | Terechko | G06F 1/3287 713/324 |

OTHER PUBLICATIONS

Shen et al.; Modern Processor Design: Fundamentals of Superscalar Processors, Beta Edition; McGraw-Hill; 2002.*
(Continued)

*Primary Examiner* — Corey S Faherty
(74) *Attorney, Agent, or Firm* — Brian D. Graham; Charles A. Brill; Frank D. Cimino

(57) ABSTRACT

The invention relates to an electronic device for data processing, which includes an execution unit with a temporary register, a register file, a first feedback path from the data output of the execution unit to the register file, a second feedback path from the data output of the execution unit to the temporary register, a switch configured to connect the first feedback path and/or the second feedback path, and a logic stage coupled to control the switch. The control stage is configured to control the switch to connect the second feedback path if the data output of an execution unit is used as an operand in the subsequent operation of an execution unit.

20 Claims, 5 Drawing Sheets

Related U.S. Application Data division of application No. 13/228,978, filed on Sep. 9, 2011, now Pat. No. 9,086,887.

(52) U.S. Cl.
    CPC ...... *G06F 9/30101* (2013.01); *G06F 9/30189* (2013.01); *G06F 9/3861* (2013.01)

(56) References Cited

OTHER PUBLICATIONS

Ahuja, P.S.; Clark, D.W.; Rogers, A.: The performance impact of incomplete bypassing in processor pipelines. In: Proceedings of the 28th Annual International Symposium on Microarchitecture, 1995, S. 36-45.—ISSN 1072-4451. https://doi.org/10.1109/MICRO.1995.476811; dated Jul. 23, 2021.

Cohn, Robert; Gross, Thomas; Lam, Monica: Architecture and Compiler Tradeoffs for a Long Instruction Wordprocessor. In: SIGARCH Comput. Archit. News, 17, 1989, 2, S. 2-14.—ISSN 0163-5964. https://doi.org/10.1145/68182.68183; dated Jul. 23, 2021.

Processor register. In: Wikipedia, the free encyclopedia. Bearbeitungsstand: 14.09.2010. URL: https://en.wikipedia.org/w/index.php?title=Processor_register&oldid=384854707; dated Jul. 26, 2021.

Sami, M. et al.: Low-Power Data Forwarding for VLIW Embedded Architectures. In: IEEE Transactions on Very Large Scale Integration (VLSI) Systems, vol. 10; dated 2002; pp. 614.

Shrivastava, A. [et.al.]: Retargetable pipeline hazard detection for partially bypassed processors. In: IEEE Transactions on Very Large Scale Integration (VLSI) Systems, 14, 31.07.2006, 8, S. 791-801.—ISSN 1557-9999. https://doi.org/10.1109/TVLSI.2006.878468; dated Jul. 23, 2021.

Yan, Jun; Zhang, Wei: Virtual Registers: Reducing Register Pressure Without Enlarging the Register File. In: HiPEAC 2007: High Performance Embedded Architectures and Compilers, 2007, S. 57-70. https://doi. rg/10.1007/978-3-540-69338-3_5; dated Jul. 23, 2021.

DE Office Action for T69220DE01; DE Application No. 10 2010 045 800.7; dated Jul. 27, 2021.

\* cited by examiner

ELECTRONIC DEVICE AND METHOD FOR DATA PROCESSING USING VIRTUAL REGISTER MODE

CLAIM OF PRIORITY

This application claims priority under 35 U.S.C. 119(a) to German Patent Application No. 10 2010 045 800.7 filed Sep. 20, 2010.

TECHNICAL FIELD OF THE INVENTION

The invention relates to an electronic device and a method for data processing and more specifically, to an electronic device and a method for efficiently performing operations on data.

BACKGROUND OF THE INVENTION

Conventional central processing unit (CPU) architectures always require read and write accesses to register files (data storages, memories) for address or data processing. A register file write occurs even if there is an internal path configured to forward a result of a previous processing step. This write is required because the operand of the subsequent operation might not be known. Program execution might be interrupted by events or internal nodes needing the results of processing steps. This requires storing the results of data processing steps.

Some digital signal processor (DSP) architectures are configured to use arithmetic/logic unit (ALU) output data in further processing. This is generally limited to internal parallel processing and requires additional memory. All memory write and read accesses consume power which is generally undesirable for low power applications.

SUMMARY OF THE INVENTION

It is an object of the invention to provide an electronic device and a method for operating an electronic device consuming less power and being safer during data processing than the prior art.

In one aspect of the invention, an electronic device for data processing includes at least one execution unit (for example an arithmetic/logic unit (ALU), a barrel shifter or an address calculation unit) with a temporary register, a register file, a first feedback path from the data output of the execution unit to the register file and a second feedback path from the data output of the execution unit to the temporary register. A switch connects either the first feedback path or the second feedback path. A logic stage is coupled to control the switch to connect the second feedback path if the data output of the same or another execution unit is used as an operand in the subsequent operation of the execution unit. This means that the internal data/address forward path could be used to hand over the actual result to the next operation. Register file (data storage, memory) write or read commands are not needed. This reduces power consumption. This combination of commands can provide an atomic sequences of commands which may not be interrupted. This improves speed, safety and integrity of data processing. The operation mode using the second feedback path (consecutive commands or processing steps using the results of previous commands or processing steps) may be called a virtual register mode. A virtual register may be considered a register implemented by the second feedback path. The output of the execution unit is then directly fed back to the input of the same or another execution unit. During virtual register mode, the operation of the execution unit may be atomic so that it can not be interrupted.

According to an aspect of the invention, the control stage selects the second path in response to a command for the execution unit using a dedicated register of the register file. Using a dedicated register is a very reliable way of entering into the second feedback path virtual register mode. This does not require any modification of the electronic device or the opcodes used by the execution unit(s).

In one embodiment the virtual register mode is entered if an opcode or a command uses the dedicated register as a data destination. This connects the second feedback path from the output of the execution second feedback path to the input of the same or another execution unit of the electronic device. Using a dedicated register as destination (not source) register is advantageously the only manner to enter the virtual register mode.

According to one embodiment of the invention, the virtual register mode is exited if the dedicated register is used as source only and no longer as destination. In another embodiment of the invention, the virtual register mode is exited if the dedicated register is neither used as a source nor as a destination. This enables multiple writes. Further alternative embodiments use dedicated instructions or existing instructions or specific bits in their opcode to end the sequence and leave virtual register made.

In another embodiment of the invention, the control stage connects the second path in response to a command for the execution unit using a dedicated read-only register. A constant generation register or the like may be used as the indicator to connect the second feedback path. The constant register may be read only register. By definition a read only register does not accept write commands. In a further alternative this constant register does not accept read commands.

Advantageously, the register file (data storage, memory) clock is switched off upon connection of the second feedback path. The signals for the register file, data storage or memory holding the output data are idle during the virtual register mode during which the second feedback path is closed (connected). This reduces power consumption.

In another embodiment of the invention, the temporary register is part of an execution unit not providing the data output to the second feedback path. The electronic device includes several similar or different execution units. The second feedback path is configured to feed the output of each execution unit to the input of the same or other execution units.

The invention is also a method for operating an electronic device. A command feeds an execution unit in a first commanding step. The command can request reuse of a data output of a preceding processing step as an input for the present processing step. A switch is controlled to feed the data output of the execution unit of the preceding processing step to a temporary register of an execution unit performing the present processing step and not to a register file in response to the first commanding step. A next command to the execution unit in a second commanding step indicates only that the data to be used as an input for the present processing step is different from the output of a preceding processing step. The switch can then be controlled to feed the data output of the execution unit of the preceding processing step to the register file and not to the temporary register of an execution unit in response to the second commanding step.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
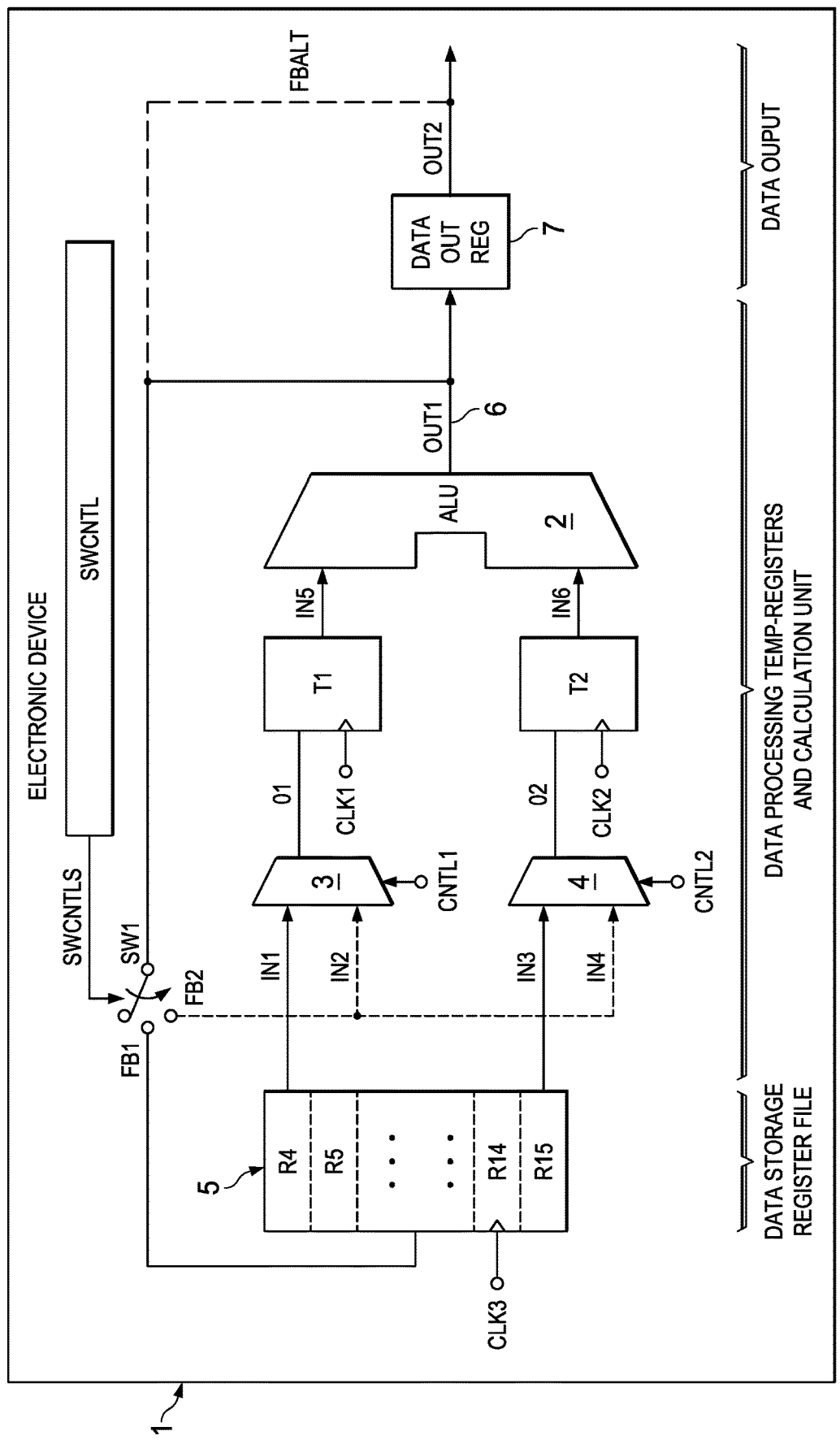
FIG. 1 shows a simplified circuit and block diagram of an embodiment of the invention.

FIG. 1 shows a simplified circuit and block diagram of an electronic device 1 according to aspects of the invention. The electronic device 1 includes a execution unit 2 having multiplexers 3 and 4 at its inputs. The multiplexers 3 and 4 receive respective control signals CNTL1 and CNTL2. The control signals CNTL1 and CNTL2 are configured to select either input signal IN1 or IN2 at temporary register T1 and to select either input signal IN3 or IN4 at temporary registers T2. The invention is not limited to temporary input registers. Alternatively or in addition to input registers T1 and T2, one or more output registers 7 may be used. This is indicated by the dashed alternative feedback path FBALT. With the dashed alternative feedback path, it is possible to use either an output register 7 as temporary register or input and output registers as temporary registers. If the output register 7 is used as the temporary register, input registers T1 and T2 can be omitted. Thus input registers T1 and T2 are only optional in the following embodiments, if register 7 is used in combination with feedback path FBALT. The temporary registers (output or input) can be any kind or storing elements. FIG. 1 also illustrates a register file 5 storing data used or provided by the execution unit 2 or other execution units (not shown in FIG. 1). Register file 5 includes registers R4, R5 to R14 and R15. The invention is not limited to this number of registers and more or less than those of the present embodiment is feasible. Clock signal CLK1 controls temporary register T1. Clock signal CLK2 controls temporary register T2. Clock signal CLK3 controls register file 5. Clock signals CLK1, CLK2 and CLK3 may all be the same or may differ but have the same frequency and/or the same phase. Execution unit 2 has a data output 6 providing data processing results. Execution unit 2 may be an arithmetic/logic unit (ALU) as illustrated, a barrel shifter, an address calculation unit or any other kind of data processing or execution unit. Execution unit 2 receives input data IN5 and IN6 and provides output data OUT1 6 based on data processing of the input data IN5 and IN6. Execution unit 2 performs data processing steps in response to a sequence of commands. These commands are typically provided as a software program and stored in a volatile or non volatile memory (not shown). The two temporary registers T1 and T2 supply input data to execution unit 2. There are two alternative feedback paths FB1 and FB2. First feedback path FB1 feeds data OUT1 6 output by execution unit 2 to register file 5. First feedback path FB1 is used when the output data OUT1 6 of execution unit 2 is not used in a subsequent immediately following processing step to the processing step that generated output data OUT1 6 on feedback path FB1.

The second feedback path FB2 feeds data OUT1 6 of execution unit 2 back to the input of execution unit 2. Output data OUT1 6 of execution unit 2 is fed to an input of one of the multiplexers 3 or 4, if the second feedback path FB2 is used. From multiplexer 3 data of second feedback path FB2 is passed as signal O1 to temporary register T1. From multiplexer 4 data of second feedback path FB2 is passed as signal O2 to temporary register T2. Temporary registers T1 and T2 are inputs to execution unit 2. This input data IN5 and IN6 is then further processed by execution stage 2 in a subsequent processing step. Output data OUT1 6 is stored in output register 7 and supplied to other stages as registered output signal OUTR.

Switch SW1 provides controlled switching between the feedback paths FB1 and FB2. Switch SW connects either first feedback path FB1, second feedback path FB2 or both feedback paths FB1 and FB2 at the same time. Switch SW1 represents the mechanism for switching (connecting) the two feedback paths FB1 and FB2. Switch SW1 connects the first feedback path FB1 and/or the second feedback path FB2. Both feedback paths FB1 and FB2 may be active at the same time. Three basic modes may then be distinguished as shown in Table 1:

TABLE 1

| Mode | Feedback Path 1 | Feedback Path 2 |
| --- | --- | --- |
| No forwarding | FB1 connected | FB2 disconnected |
| Simple Forwarding | FB1 connected (saving in case an interrupt or the like occurs) | FB2 connected (enhancing processing) |
| Virtual Register Mode (VRM) | FB1 disconnected (reducing current consumption) | FB2 connected (enhancing processing) |

Switch SW1 is controlled by control signal SWCNTLS provided by switching control stage SWCNTL. Switching control stage SWCNTL generates the switching control signals SWCNTLS according to predetermined rules. Accordingly, the second feedback path FB2 is connected and the first feedback path FB1 is disconnected on entering the Virtual Register Mode (VRM). In this mode the current processing step of execution unit 2 directly uses a result of the previous processing step. Switching control stage SWCNTL evaluates the sequence of processing steps (evaluation of the commands, opcodes etc.). VRM may be selected if the result of a previous step is used in the subsequent step. This evaluation may be performed in real time while the commands operate or their corresponding processing steps are performed in the execution unit 2. In an alternative embodiment, the evaluation of the sequence of commands with respect to the reuse of processing results in consecutive steps is performed before execution of the commands.

Likewise, the switching control stage may connect both feedback paths FB1 and FB2 to allow result to be stored while the result is also directly passed through FB2 to the input of execution unit 2. This may be useful if an interrupt of signal processing is expected.

In a normal mode only feedback FB1 is connected and FB2 is disconnected.

In an embodiment of the invention, a sequence of commands for which the second feedback path FB2 is to be used, are combined into a single atomic command or a single atomic sequence of commands. This means that the execution of these commands cannot be interrupted. The rule for combining commands to an atomic sequence is that consecutive processing steps (commands, opcode) use the result of a preceding processing step (commands, opcode) in a directly following processing step as an input signal. This means that the result of the preceding processing step is not stored in the register file 5. Instead, the output 6 of the execution unit 2 is only fed back to the input of execution unit 2.

If the result of a processing step is needed in a processing step not the directly subsequent processing step to the one producing the result, the first feedback path FB1 is connected and used. This supplies the data output 6 of the execution unit 2 to the register file 5 by switch SW1. The first feedback path FB1 is then connected and the second feedback path FB2 is disconnected. The result of the previous processing step (the processing step that provided the result OUT1 6 presently pending) is stored in register file 5. This can be done with a write command and clock signal CLK3.

If the second feedback path FB2 is used and the first feedback path FB1 is disconnected, some or all signals for the register file 5 can be idle. Register file 5 may be operated to minimize power consumption. If switching clock signals or any other signals relating to read and write commands of the register file 5 are stopped, the power consumption is substantially reduced.

In order to optimize the power consumption and safety, program sequences may be optimized such that the amount of consecutive commands reusing the results of directly preceding commands is increased. These commands can then be combined into a single atomic sequence of commands. This sequence of commands can be combined to a single instruction, for example to a new command. The electronic device 1 is then advantageously configured to prevent any interruption during execution of the sequence of commands or single command being the combination of multiple commands.

The following sequence of commands may be combined to a single atomic sequence or atomic command during which the switch SW1 is controlled to connect the second feedback path FB2 and the first feedback path FB1 is disconnected:

|  |  |
|---|---|
| MOV | R10, Rv |
| ADD | #0x10, Rv |
| SUB | R11, Rv |
| RLA | Rv |
| MOV | INPUT (Rv), R12 |

The examples and embodiment of the invention are not limited to two operand registers. Three, four or more operands may be used. If one of these registers is Rv, the virtual register mode may be activate and the atomic-forwarding remains active. This aspect of the invention is independent of the data format.

According to this sequence of commands, the content of register R10 of register file 5 is moved to a register Rv. Register Rv is the name of a virtual register implemented by using second feedback path FB2. The actual implementation of the virtual register Rv is one of the temporary registers T1 or T2 at the input of the execution unit 2. In the next processing step directly following the MOV-command, a hexadecimal value 0x10 is added to the value in the virtual register. This means that the ADD-command reuses the result of the previous processing step, the content of virtual register Rv. A subtract command SUB directly follows the ADD-command. The content of register R11 of register file 5 is subtracted from the value of virtual register Rv. The next command RLA (Rotate Left Arithmetic) shifts the content in virtual register Rv. Finally, the content of virtual register Rv is used as address pointer to a memory location and the memory content is moved to register R12 of register file 5. Each command of the above sequence of commands uses the virtual register Rv and stores the processing step result in virtual register Rv. The content of the virtual register is therefore directly reused in each subsequent processing step. This means the rules for switching switch SW1 apply. Switch SW1 remains in the position connecting the output of execution unit 2 to input of execution unit 2 through multiplexers 3 and 4 and temporary registers T1 and T2.

Another example is a memory to memory copy using the virtual register Rv.

|  |  |
|---|---|
| LOAD | @R15+, Rv |
| STORE | Rv, @−R14 |

The content of virtual register Rv is used as input in both processing steps. Both of the commands or opcodes (LOAD, STORE) use virtual register Rv as input. The LOAD step supplies the content of Rv as an operand for the next step (STORE).

The virtual register mode is not limited to processes internal to a CPU. It can be used for load and store procedure. If for example data from a storage location (memory etc.) is read which are to be processed, the virtual register mode may also be advantageously employed. The follow pseudo opcode shows a first example:

|  |
|---|
| LOAD #123456, Rv |
| ADD Rv, R4 |

The virtual register mode also applies to a storing procedure. The data value stored in address 123456 is stored in virtual register Rv (LOAD). This data value stored in virtual register Rv is added to the data value stored in register Rv (ADD). In a second example, the intermediate value Rv may be stored in a registers as well as in the memory. This means that the values can be loaded into the CPU (or another execution unit), a algorithmic step may be performed and the result may be written back without storing intermediate values in the register file. The following pseudo opcode shows this second example:

|  |
|---|
| LOAD &MEMORY, Rv |
| RRA Rv |
| SUB #1, Rv |
| STOR Rv, &MEMORY |

Accordingly, data is loaded from the memory (LOAD), shifted (Rotate Right Arithmetic, RRA), the value one is subtracted from the register, and the value Rv is written back to the memory (STOR) without storing intermediate values in the register file.

Figure 2:
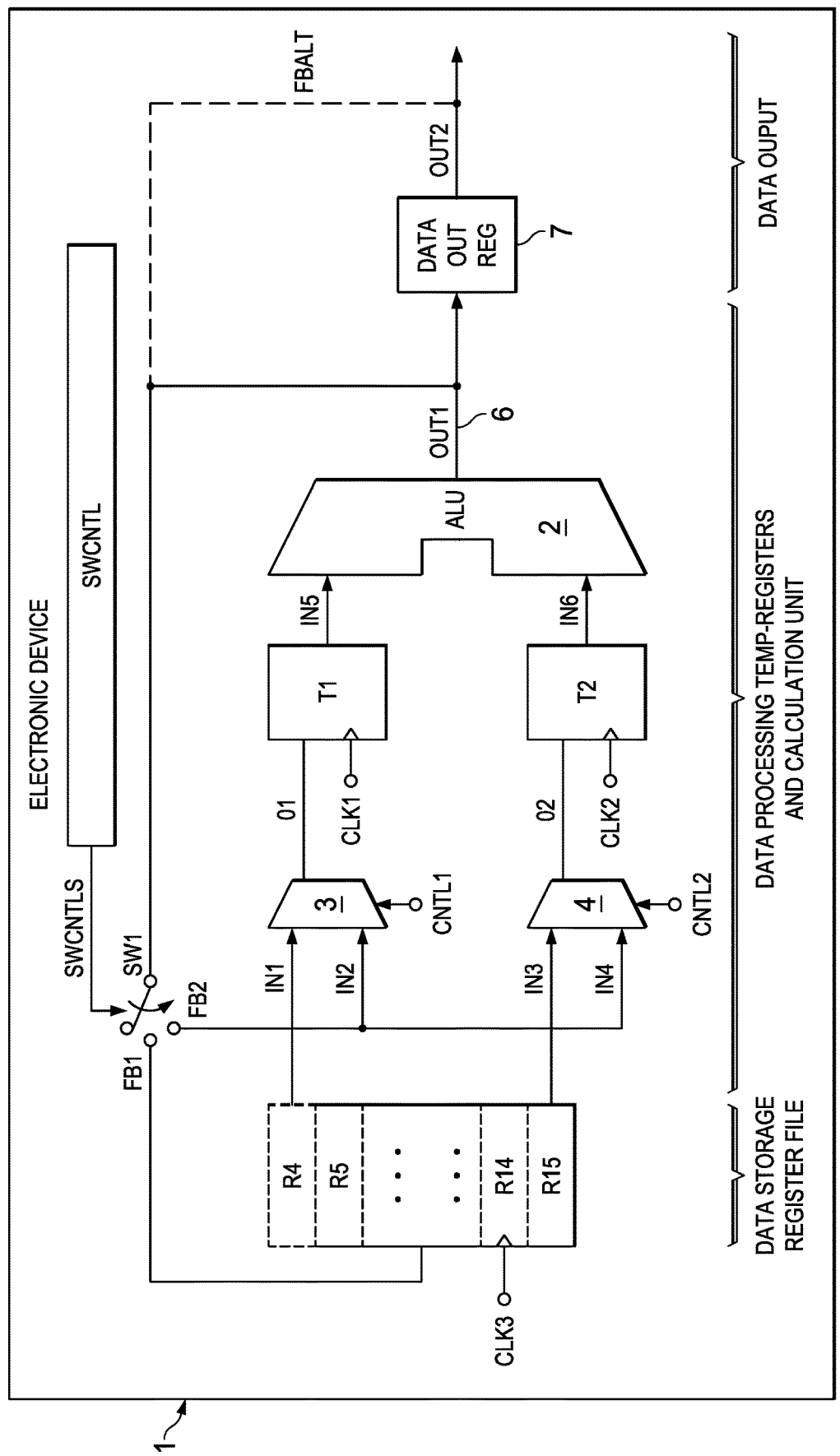
FIG. 2 shows a simplified circuit and block diagram of another embodiment of the invention.

FIG. 2 shows a simplified circuit and block diagram of an electronic device 1 configured according to further aspects of the invention. The embodiment shown in FIG. 2 is a possible hardware implementation of the invention. The present invention requires specific register-file read/write accesses to be skipped. This can be achieved with dedicated instructions (commands, opcodes etc.). In an aspect of the invention, bit fields in the opcode of an execution unit 2 may be used. In another aspect, specific register values or bits may be intentionally left free in order to indicate that the second feedback path 2 is to be used.

In the embodiment shown in FIG. 2 a not physically implemented register R4 is used. Register R4 acts as the virtual register Rv referred to in the above command sequences. If register R4 is addressed in a read or write command, this will not result in read or write operation on the register. The clock CLK3 will remain idle and no data or clock signals for register file 5 are changed or toggled. The first feedback path FB1 and the output signals of registers file 5 are inactive if register R4 is used. Using R4 in a command results only in a closed second feedback path FB2. The output of execution unit 2 is fed to the input of the execution unit through multiplexer 3 or 4 and respective temporary registers T1 or T2.

Figure 3:
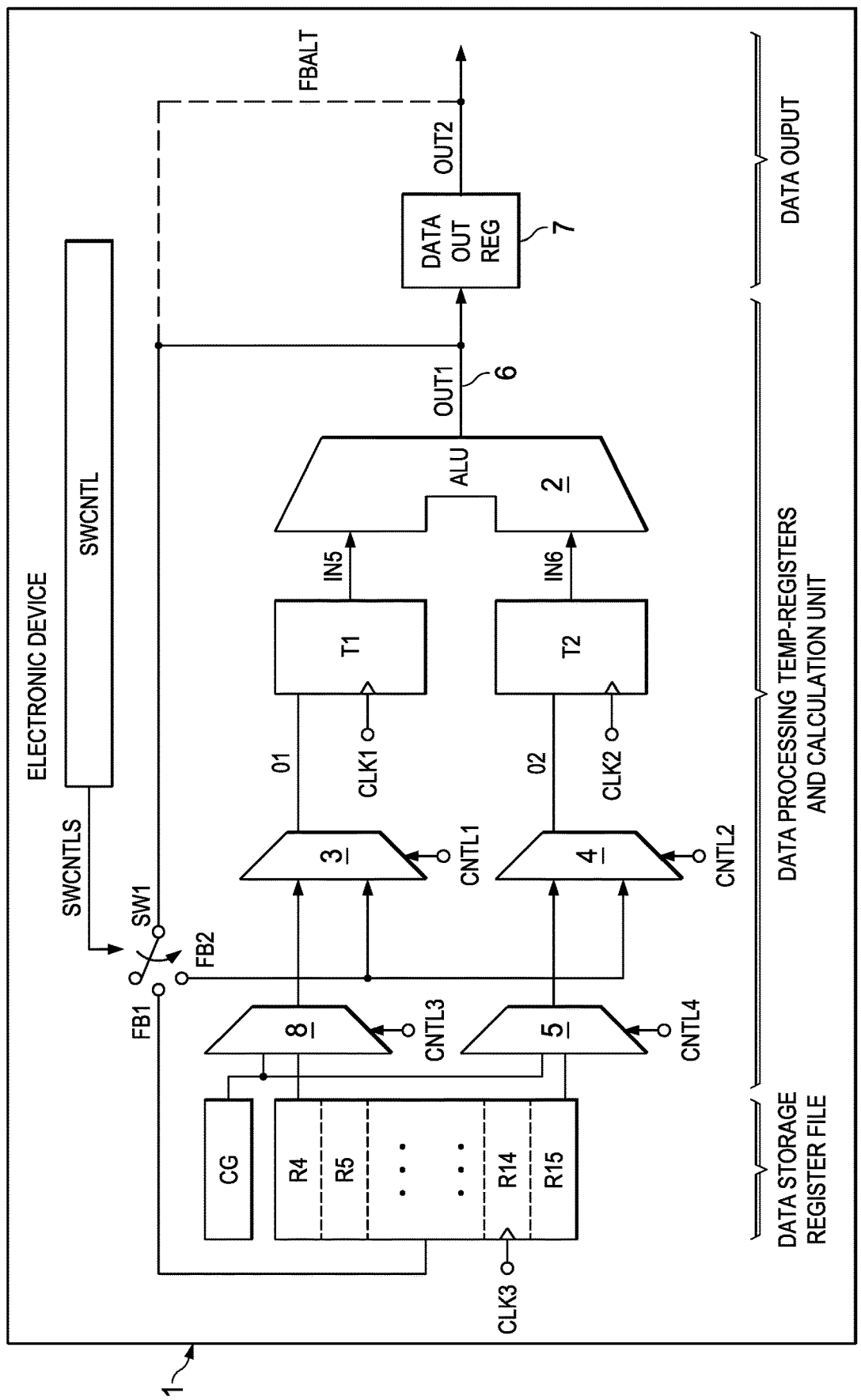
FIG. 3 shows a simplified circuit and block diagram of still another embodiment of the invention.

FIG. 3 shows still another embodiment of the invention. In this embodiment a read-only register CG, such as a constant generator or the like is used as the virtual register Rv indicating that the second feedback path FB2 is to be used. Any command using the register CG results in closing feedback path FB2. The output of execution unit 2 is then fed back to its input. The read-only register does per definition not allow write access. The read-path can be kept silent as well. Thus register CG may not generate any constants or the like. The first feedback path FB1 and the outputs of register file 5 remain idle during any commands using register CG.

Figure 4:
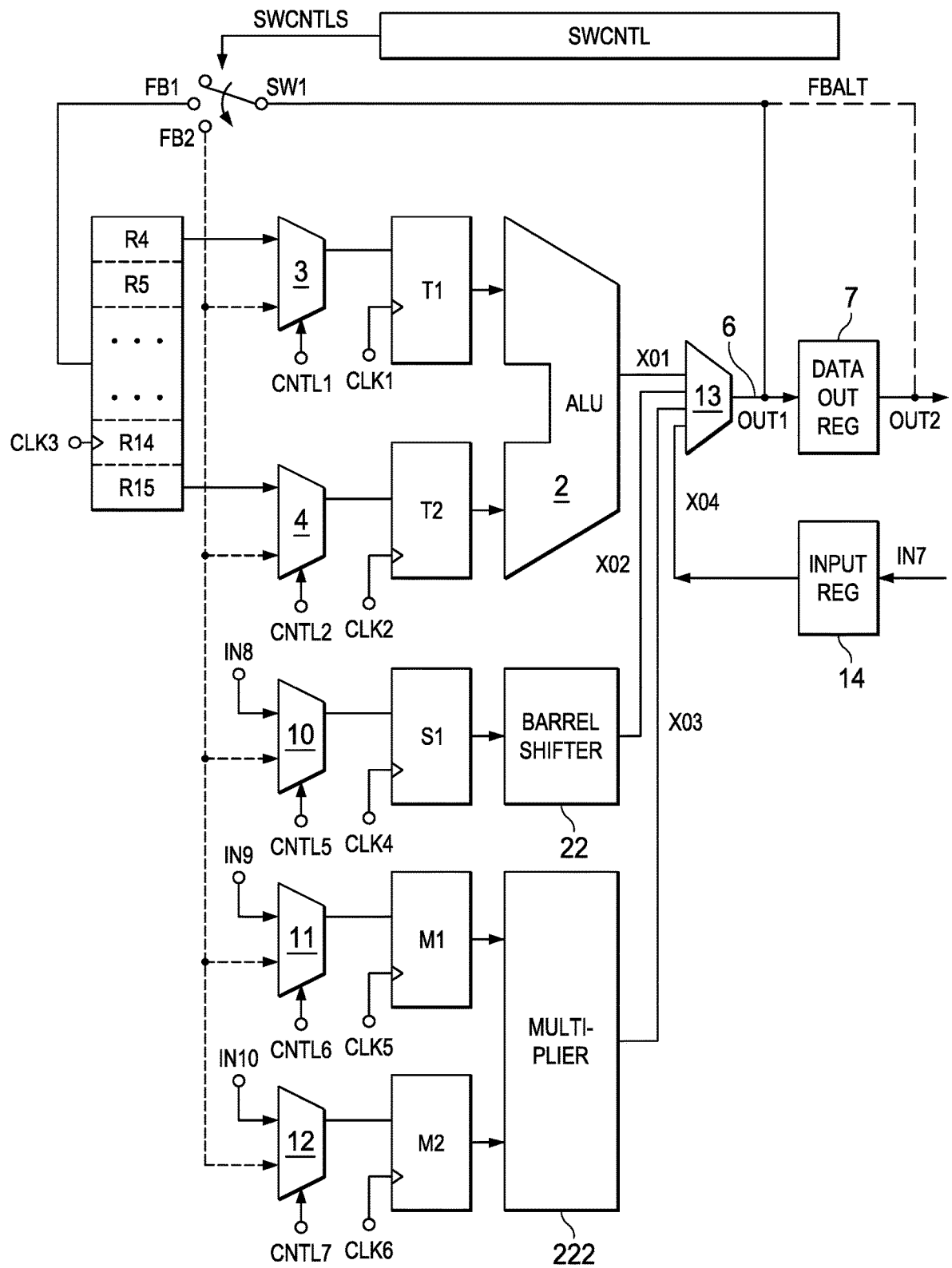
FIG. 4 shows a simplified circuit and block diagram of still another embodiment of the invention.

FIG. 4 shows an simplified circuit and block diagram of another embodiment of the invention. The electronic device 1 includes several different or similar execution units 2. There may be an ALU 2, a barrel shifter 22 and a multiplier 222. The outputs X01, X02 and X03 of the respective execution units 2, 22 and 222 are selected by multiplexer 13 to output 6. Furthermore, an additional arbitrary input signal IN7 may be passed through an input register 14 and passed as signal X04 to multiplexer 13. The output signal OUT1 6 is then fed back through either first feedback path FB1 or second feedback path FB2 as explained with respect to the other embodiments of the invention. The execution unite 2, 22 and 222 have respective input multiplexers 3, 4, 10, 11 and 12 and have respective temporary register T1, T2, S1, M1 and M2. Multiplexers 3, 4, 11, 12 are controlled with respective control signals CNTL1, CNTL2, CNTL5, CNTL6 and CNTL7. The temporary registers T1, T2, S1, M1 and M2 receive respective clock signals CLK1, CLK2, CLK4, CLK5 and CLK6. The invention can also be applied electronic devices comprising multiple different or similar execution units 2, 22 and 222. A previous processing step may then relate to a different execution unit as the one used in the subsequent processing step.

Figure 5:
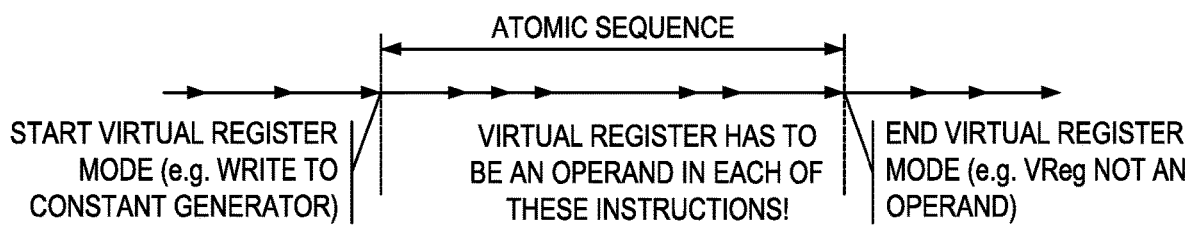
FIG. 5 shows a diagram illustrating transition to atomic operation according to the invention.

FIG. 5 is a simplified diagram illustrating the atomic character and the transition into atomic operation according to aspects of the invention. Any execution unit 2 may operate in normal mode using the first feedback path FB1 and register file 5. However, if a command is processed which uses a virtual register Rv, such as a write to read-only register CG as described in conjunction with FIG. 3 or a register R4 as described in conjunction with FIG. 2, the second feedback path FB2 is closed and an atomic operation is performed. Interrupts or any other events which could normally interrupt the operation are prevented. Only after finishing the atomic sequence, are interrupts or events admitted and program execution can be interrupted. The end of the atomic sequence is reached if the virtual register Rv is no longer used as an operand. This point may also be referred to as the end of the virtual register mode.

In an embodiment of the invention, a pre-decoder in the first stages of a processor (execution unit 2) may be used to decode the virtual register Rv as the destination register and activate the atomic mode (virtual register mode) in response to the detected use of the virtual register. During atomic operation (or atomic mode) no interrupts are accepted.

According to another aspect of the invention, a code generation tool may adapted to generate code for the execution unit 2. This code generation tool is configured to reorder instructions for the execution unit in order to improve pipeline efficiency or use delayed branch slots. The code generation tool is further configured to reorder instructions with respect to increase consecutive instructions (commands, opcode, processing steps) using the output or result of a processing step as an operand in the subsequent processing step. The code generation tool according to the invention can also be configured to ensure atomic operation by blocking interrupts.

The aspects of the invention are not limited to operation of an ALU and data processing. Basically every forward path in the system can be used as a virtual register. As shown in FIG. 4, all data paths from an output of an execution unit 2, 22 or 222 can be used as virtual register Rv. Even operand loads from memory (not necessarily via an input register) could be fed directly into an execution unit.

What is claimed is:

1. An electronic device for data processing comprising:
   an execution unit having at least one input receiving an operand and a data output generating a result corresponding to an operation of a sequence of operations;
   an input register;
   a register file having a plurality of accessible read/write data registers;
   a first feedback path from the data output of the execution unit to an input of the register file;
   a second feedback path from the data output of the execution unit to an input of the input register;
   a switch coupled in the first feedback path and the second feedback path; and
   a switch control stage coupled to the switch, wherein the switch control stage is configured to implement a virtual register having an address by:
      based on an instruction that references the address of the virtual register, controlling the switch to complete the second feedback path to couple the data output of the execution unit to the input of the input register.

2. The electronic device of claim 1, further comprising:
   a clock connected to the register file to control timing of operations in the register file; and
   wherein the clock for the register file is switched off if the second feedback path is connected.

3. The electronic device of claim 1, further comprising:
   at least one additional execution unit having at least one input receiving an operand and an data output generating a result corresponding to an operation of a sequence of operations;
   an additional input register corresponding to each input of the at least one additional execution unit connected to the corresponding input;
   an output multiplexer having a first input connected to the output of the execution unit and further inputs connected to respective ones of the output of each of the at least one additional execution unit and an output, the output multiplexer selecting one input for output; and the second feedback path is connected from the output of the output multiplexer to the input register and each additional input register.

4. The electronic device according to claim 1, wherein: the execution unit is an arithmetic/logic unit (ALU).

5. The electronic device according to claim 1, wherein: the execution unit is a barrel shifter.

6. The electronic device according to claim 1, wherein: the execution unit is an address calculation unit.

7. The electronic device according to claim 1, wherein: the execution unit is a multiplier.

8. A circuit device comprising:
an execution unit that includes an input and an output;
a register file that includes an input and an output coupled to the input of the execution unit;
a first feedback path coupled between the output of the execution unit and the input of the register file that includes a switching unit;
a second feedback path coupled between the output of the execution unit and the input of the execution unit that includes the switching unit and does not include the register file; and
a switch control stage coupled to the switching unit and configured to implement a virtual register having an address by controlling the switching unit to enable the second feedback path in response to an instruction that specifies the address of the virtual register.

9. The circuit device of claim 8, wherein the register file is configured to enter a low power state in response to the instruction that specifies the virtual register.

10. The circuit device of claim 8 further comprising a multiplexer that includes:
a first input coupled to the output of the register file;
a second input coupled to the second feedback path;
an output coupled to the input of the execution unit; and
a control input coupled to receive a control signal.

11. The circuit device of claim 10 further comprising an input register coupled between the output of the multiplexer and the input of the execution unit.

12. The circuit device of claim 11, wherein:
the register file includes a clock input coupled to receive a first clock;
the input register includes a clock input coupled to receive a second clock; and
the first clock is configured to be idle in response to the instruction that specifies the virtual register.

13. The circuit device of claim 8, wherein:
the execution unit is a first execution unit; and
the circuit device further comprises a set of execution units that includes the first execution unit coupled in parallel between the register file and the second feedback path.

14. The circuit device of claim 13 further comprising a multiplexer that includes:
a set of inputs coupled to the set of execution units; and
an output coupled to the first feedback path and to the second feedback path.

15. The circuit device of claim 8 further comprising:
a constant generation register that is not writable by the execution unit and that includes an output; and
a multiplexer that includes:
a first input coupled to the output of the register file;
a second input coupled to the output of the constant generation register;
an output coupled to the input of the execution unit; and
a control input coupled to receive a control signal.

16. The circuit device of claim 8 further comprising a data out register that includes an input coupled to the output of the execution unit and an output, wherein:
the first feedback path is coupled to the output of the execution unit and the input of the data out register; and
the data out register is coupled between the output of the execution unit and the second feedback path.

17. The circuit device of claim 8, wherein the execution unit includes an arithmetic/logic unit (ALU).

18. The circuit device of claim 8, wherein the execution unit includes a barrel shifter.

19. The circuit device of claim 8, wherein the execution unit includes an address calculation unit.

20. The circuit device of claim 8, wherein the execution unit includes a multiplier.

* * * * *